(12) United States Patent
Persaud

(10) Patent No.: US 11,436,574 B1
(45) Date of Patent: Sep. 6, 2022

(54) DIGITAL RECEIPT SYSTEM

(71) Applicant: Deepak Persaud, Boynton Beach, FL (US)

(72) Inventor: Deepak Persaud, Boynton Beach, FL (US)

( * ) Notice: Subject to any disclaimer, the term of this patent is extended or adjusted under 35 U.S.C. 154(b) by 0 days.

(21) Appl. No.: 17/345,148

(22) Filed: Jun. 11, 2021

(51) Int. Cl.
*G06Q 20/04* (2012.01)
*G06K 7/14* (2006.01)
*G06Q 20/20* (2012.01)

(52) U.S. Cl.
CPC ......... *G06Q 20/047* (2020.05); *G06K 7/1413* (2013.01); *G06Q 20/208* (2013.01); *G06Q 20/209* (2013.01)

(58) Field of Classification Search
CPC .. G06Q 20/047; G06Q 20/208; G06Q 20/209; G06K 7/1413
See application file for complete search history.

(56) References Cited

U.S. PATENT DOCUMENTS

| | | | |
|---|---|---|---|
| 8,332,272 B2 | 12/2012 | Fisher | |
| 10,346,874 B2 | 7/2019 | Boal | |
| 2003/0115135 A1* | 6/2003 | Sarfraz | G06Q 30/06 705/26.1 |
| 2012/0084391 A1* | 4/2012 | Patel | G06Q 20/047 709/217 |
| 2013/0204697 A1* | 8/2013 | Boal | G06Q 10/00 705/14.51 |
| 2014/0052618 A1* | 2/2014 | Drozd | G06Q 20/047 705/39 |
| 2014/0095985 A1* | 4/2014 | Argue | G06Q 20/047 715/243 |
| 2014/0310174 A1* | 10/2014 | Heeter | G06Q 20/40 455/411 |
| 2014/0372198 A1* | 12/2014 | Goldfinger | G07G 1/14 705/14.33 |
| 2017/0249612 A1* | 8/2017 | Sanbe | G06Q 20/202 |
| 2018/0018739 A1* | 1/2018 | Ando | G06Q 40/12 |
| 2019/0066064 A1* | 2/2019 | Liu | G06Q 20/209 |
| 2020/0387875 A1* | 12/2020 | Hara | G07G 1/0036 |

OTHER PUBLICATIONS

A payment & receipt business model in U-commerce environment, Aug. 2006 (Year: 2006).*

* cited by examiner

*Primary Examiner* — Florian M Zeender
*Assistant Examiner* — Nicole Elena Bruner
(74) *Attorney, Agent, or Firm* — Sanchelima & Associates, P.A.; Christian Sanchelima; Jesus Sanchelima

(57) ABSTRACT

A digital receipt system includes a digital receipt device that is used to process the sale information and generate a digital receipt that can be wirelessly transmitted to a cooperating application on a smart phone that allows the user to view and manage their receipts. In the present system, a device having an optical scanner is communicably connected to the existing point-of-sale system. A unique barcode is then generated on the cooperating application on the smart phone for a user. The barcode is then scanned by the device and a digital receipt is transmitted to the user over a wireless network.

7 Claims, 4 Drawing Sheets

DIGITAL RECEIPT SYSTEM

BACKGROUND OF THE INVENTION

1. Field of the Invention

The present invention relates to a digital receipt system and, more particularly, to a digital receipt system that is integrated into an existing point of sale system which scans a unique barcode provided on a user device to then transmit a digital receipt.

2. Description of the Related Art

Several designs for a receipt system have been designed in the past. None of them, however, include a digital receipt system that include device that is used to process the sale information and generate a digital receipt that can be wirelessly transmitted to a cooperating application on a smart phone that allows the user to view and manage their receipts. In the present system, a device having an optical scanner is communicably connected to the point-of-sale system. A unique barcode is then generated on the cooperating application on the smart phone for a user. The barcode is then scanned by the device and a digital receipt is transmitted to the user over a wireless network. It is known that there is the need to digitize receipts to reduce the amount of waste in the environment.

Applicant believes that a related reference corresponds to U.S. Pat. No. 8,332,272 issued for a transaction system that allows a person to use a mobile device such a smart phone to complete payments and view receipts. Applicant believes that another related reference corresponds to U.S. Pat. No. 10,346,874 issued for a system for distributing digital promotions via an electronic receipt that is generated from a physical online store. However, the cited references differ from the present invention because they fail to disclose any independent device with the optical scanner that is communicably connected to the existing point-of-sale system in addition to the phone application which generates the unique barcode.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a digital receipt system which replaces or eliminates paper receipts and reduces paper trail and waste for the environment.

It is another object of this invention to provide a digital receipt system which allows for efficient receipt management without paper receipt collection, organizing, storage, or usage.

It is still another object of the present invention to provide a digital receipt system which could be used at any service or retail collection and saves time and effort, and one that works with all existing POS systems.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
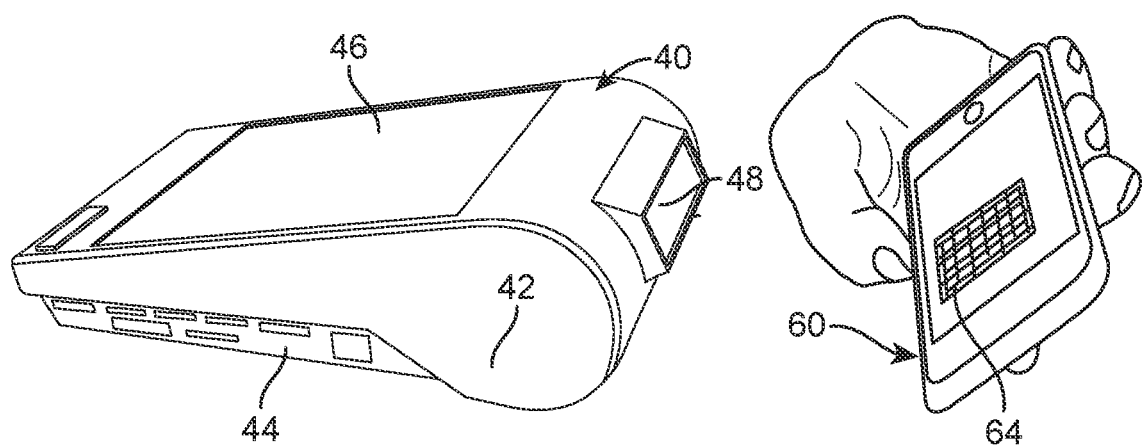
FIG. 1 represents an isometric operational view of digital receipt system 10.

Referring now to the drawings, where the present invention is generally referred to with numeral 10, it can be observed a digital receipt system 10 which basically includes a POS assembly 20, a device assembly 40, and a mobile device 60.

Figure 2:
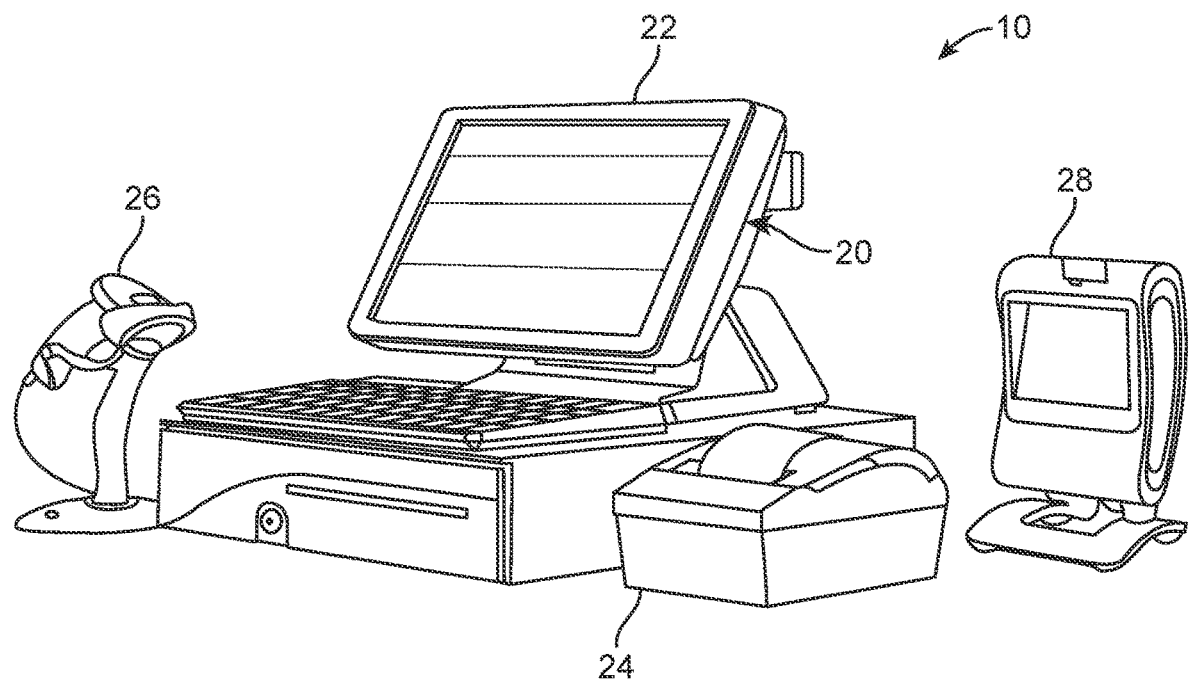
FIG. 2 shows an isometric view of POS assembly 20 in accordance to an embodiment of the present invention.

Point-of-Sale (POS) assembly 20 includes a computer 22. It should be understood, computer 22 may include a POS module that is stored within memory and being run by a processor. The POS assembly 20 allows for a retailer or user to process payments for goods or services being sold. In one embodiment, computer 22 may include a plurality of interfaces such as a LED touch screen display. Furthermore, a keyboard may be included as an interface in order to allow for a user to input commands and modify various parameters of the POS assembly. In one implementation, as observed in FIG. 2 of the drawings, computer 22 may be disposed on top of a cashier lock box as is common in retailers and places of business. This box allows users to store cash that is used to process payments.

POS assembly 20 further includes a receipt device 24 that is in communication with computer 22. It should be understood that receipt device 24 is in communication with computer 22 over a wired or wireless communication means. This may include wireless communication protocols such as WIFI, 4G, 5G, LTE, and similar wireless communication means. Traditionally, once the POS system processes a transaction, receipt device 24 will print out a paper receipt for a customer detailing the summary of their transaction. This helps customers verify their transactions and properly report their finances to government institutions. The present invention seeks to eliminate the need for paper receipts to further benefit the environment by getting rid of the paper waste associated with receipts by replacing the existing POS system receipt printers with the new device assembly 40.

POS assembly 20 further includes a bar code scanner 26. Bar code scanner 26 aids a user in processing goods and services through the POS system in order to deliver a proper amount due to a customer. Bar code scanner 26 may be provided as a traditional scanner configured to read a barcode associated with a good or service that contains a price. It should be understood that other types of scanners may be implemented into the present system.

In the present embodiment, POS system further includes an optical scanner 28 which is set to scan information presented from mobile device 60 as it will be further described. Optical scanner 28 may be provided as an upright scanner that is in communication with the existing POS system over a wired or wireless network. This may include wireless communication protocols such as WIFI, 4G, 5G, LTE, and similar wireless communication means.

Mobile device 60 may be provided as any type of mobile device having a processor and memory. In the present embodiment, mobile device 60 includes a receipt module 62 stored in memory which may be provided as an executable application located on mobile device 60. Receipt module 62 then generates a permanent barcode 64 that is displayed on the mobile device 60. Barcode 64 is then scanned by optical scanner 28 or optical scanner 48. Once barcode 64 has been scanned, a digital receipt is generated by the device assembly 40 and is wirelessly transmitted to the receipt module 62. The receipt module then electronically saves customer receipts in an application folder. Additionally, the module categorizes customer receipt by days, weeks, months, and yearly. The receipt module 62 will also track the spending indicated on the receipts by day, week, and month. This will allow a user to keep track of their spending.

In one embodiment, receipt module 62 will automatically recognize the total amount of the receipts have been read by the module and will then add the total amount spent for the day, week, and month. Additionally, the receipts stored therein will be "editable" to write survey or coupon codes for retrieving coupons from various establishments such as fast-food establishments. In the present system, the network data bank that will be created will be located on a network server, when a user downloads the receipt application module 62 from an application store and then registers with the system to obtain a unique barcode 64. The barcode 64 is then stored in the network data base so when a customer scans their barcode with the device assembly 40. Device assembly 40 will recognize the unique barcode through a network interface so that the customer can then receive their digital receipt on their receipt application module 62.

Figure 3:
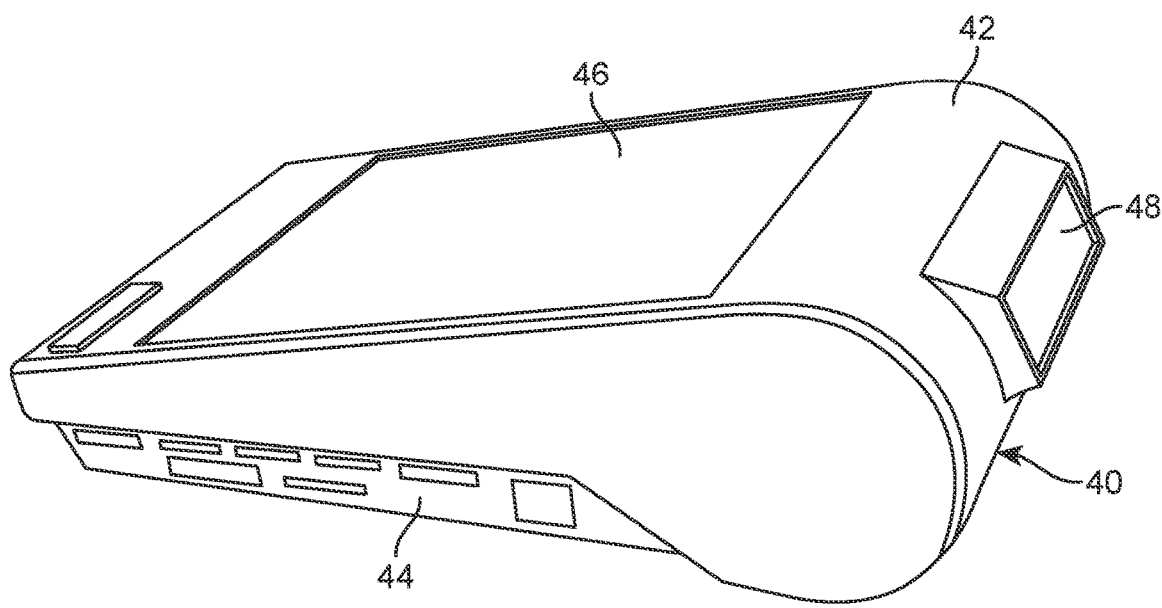
FIG. 3 illustrates an isometric view of device assembly 40 in accordance with an embodiment of the present invention.
Figure 4:
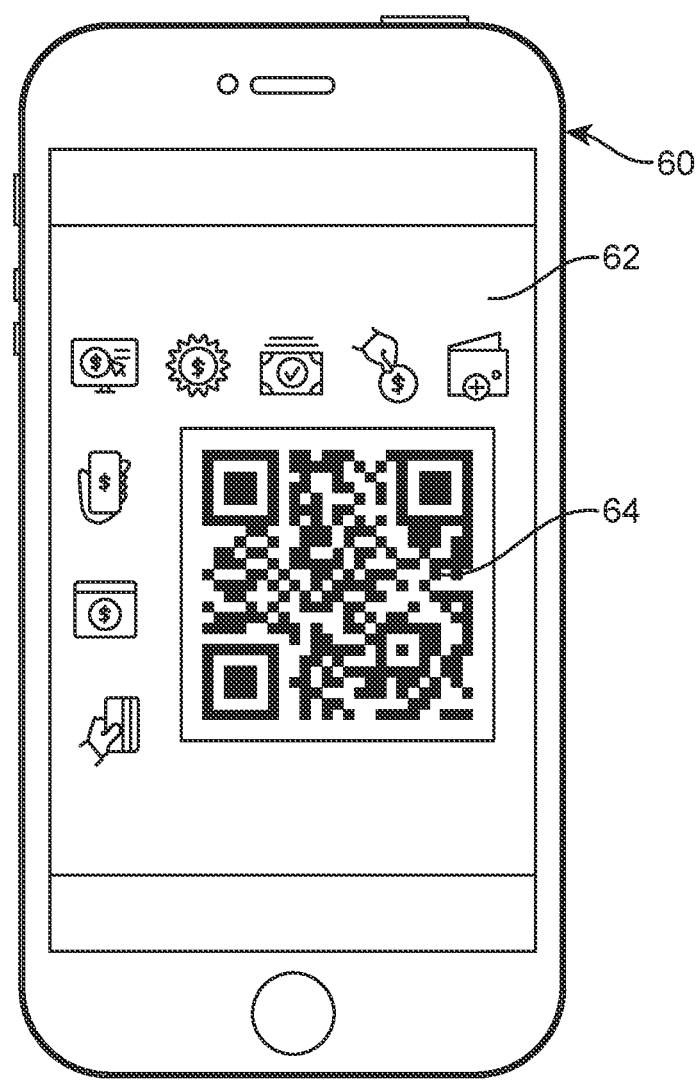
FIG. 4 is a representation of mobile device 60 in accordance with an embodiment of the present invention.
Figure 5:
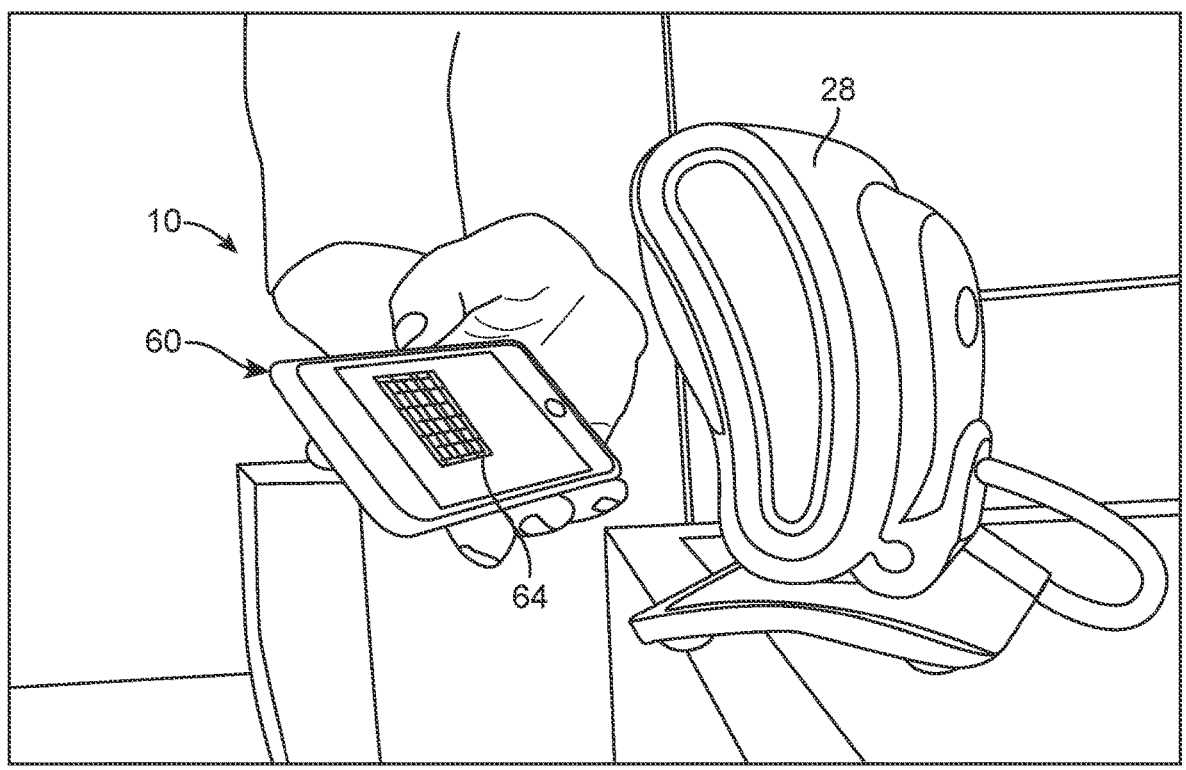
FIG. 5 shows an operational isometric view of digital receipt system 10 in accordance with another embodiment of the present invention.

Device assembly 40 includes a body 42. In one embodiment, observed in FIG. 3, body 42 may have a substantially slanted front face configuration and further includes a base and a curved rear portion. However, it should be understood that any size and shape may be implemented for body 42. Additionally, body 42 includes a universal interface 44 that may be disposed along the base of the body 42. Universal interface 44 may include various input and output modules that allows the device to connect and work any brand or model of POS system similar to the connection of a receipt printer.

In the present embodiment, device assembly 40 further includes a digital display 46 disposed along the slanted front end. Digital display 46 may be provided as a touch screen display and allows for a user to interact with device assembly 40. Furthermore, a built-in optical scanner 48 is disposed along the curved rear portion of body 42. Optical scanner 48 can scan barcode 64 in order to then send a digital receipt over a wireless network. In the present system, a user may utilize either optical scanner 28 or built-in scanner 48 in order to scan barcode 64 to then send the digital receipt to the customer.

In the present system, a user may download the receipt module 62 from a application store and create an account using a name, phone number, and other additional information to then receive their unique barcode associated with the account. In the event that a user loses their mobile device, they can easily recover their account by downloading the receipt module on a new device and logging in. The receipt module will receive and store digital receipts without sharing any personal information such as the phone number or email of a user. The present system will eliminate the factors of sharing personal information because only the barcode will be used. In the event that the mobile device runs out of battery, a key card as another option having the unique barcode can be scanned so the receipt can still be transmitted to the user receipt application module.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A digital receipt system, comprising:
   a. a device assembly including a body having a network interface, an operational software, a universal interface, a digital display, and a built-in optical scanner, said device assembly being communicably connected to a POS system, said body of the device assembly includes a slanted front end with a base and curved rear end, wherein said universal interface is disposed in said base, said universal interface includes input and output modules, wherein POS systems connect to said device assembly by means of said input and output modules; and
   b. a mobile device including a processor and memory, said memory containing a receipt module with readable instructions that when read by the processor cause the mobile device to:
      generate a unique barcode that is scannable by the built-in optical scanner, wherein said device assembly then generates a digital receipt to be transmitted to the mobile device, said mobile device is configured to generate said readable instructions when a user creates an account in said receipt module, said account is configured to include personal information of said user; and
      update a network database with the digital receipt that was generated, wherein said receipt module is configured to categorize said digital receipt by week, month, or year, said receipt module generates reports of the digital receipts that have been received, said mobile device is in communication with said database.

2. The digital receipt system of claim 1 wherein said POS system includes a receipt device which generates physical paper receipts.

3. The digital receipt system of claim 1 wherein said POS system includes an optical scanner which is able to read said unique barcode, said optical scanner includes a base, said optical scanner rests over said base.

4. The digital receipt system of claim 1 wherein said POS system further includes a barcode scanner which scans barcodes associated with goods and services being sold.

5. The digital receipt system of claim 1 wherein said digital display is disposed on the slanted front end, full covering the slanted front end, said display is a touch screen display.

6. A digital receipt system, comprising:
   a. a point-of-sale (POS) assembly, wherein said POS assembly includes a receipt device which generates physical paper receipts, wherein said POS assembly includes an optical scanner, wherein said POS assembly further includes a barcode scanner which scans barcodes associated with goods and services being sold;

b. a device assembly including a body having a universal interface, a digital display, and a built-in optical scanner, said device assembly being communicably connected to the POS assembly, said body of the device assembly includes a slanted front end with a base and curved rear end, wherein said universal interface is disposed in said base, said universal interface includes input and output modules, wherein POS assemblies connect to said device assembly by means of said input and output modules; and c. a mobile device including a processor and memory, said memory containing a receipt module with readable instructions that when read by the processor cause the mobile device to:

generate a unique barcode that is scannable by the built-in optical scanner, wherein said device assembly then generates a digital receipt to be transmitted to the mobile device, said mobile device is configured to generate said readable instructions when a user creates an account in said receipt module, said account is configured to include personal information of said user; and update a network database with the digital receipt that was generated, wherein said receipt module is configured to categorize said digital receipt by week, month, or year, said receipt module generates reports of the digital receipts that have been received, said mobile device is in communication with said database.

7. A digital receipt system, consisting of:

a. a point-of-sale (POS) assembly, wherein said POS assembly includes a receipt device which generates physical paper receipts, wherein said POS assembly includes an optical scanner, wherein said POS assembly further includes a barcode scanner which scans barcodes associated with goods and services being sold;

b. a device assembly including a body having a universal interface, a digital display, and a built-in optical scanner, having a universal interface, a digital display, and a built-in optical scanner, said device assembly being communicably connected to the POS assembly, wherein the body of the device assembly includes a slanted front end with a base and a curved rear, wherein said digital display is disposed on the slanted front end, said digital display is a touch screen display, wherein said universal interface is disposed on said base, said universal interface includes input and output modules wherein POS assemblies connect to said device assembly by means of said input and output modules c. a mobile device including a processor and memory, said memory containing a receipt module with readable instructions that when read by the processor cause the mobile device to:

generate a unique barcode that is scannable by the built-in optical scanner, wherein said device assembly then generates a digital receipt to be transmitted to the mobile device, said mobile device is configured to generate said readable instructions when a user creates an account in said receipt module, said account is configured to include personal information of said user; and update a network database with the digital receipt that was generated, wherein said receipt module is configured to categorize said digital receipt by week, month, or year, said receipt module generates reports of the digital receipts that have been received, said mobile device is in communication with said database.

\* \* \* \* \*